(12) United States Patent
Yang

(10) Patent No.: US 6,549,109 B1
(45) Date of Patent: Apr. 15, 2003

(54) MAGNET-SENSIBLE TRIGGERING DOORBELL MECHANISM

(76) Inventor: Ping-Feng Yang, No. 4, Alley 44, Lane 220, Sec. 1, An Ho Road, Tainan (TW)

(*) Notice: Subject to any disclaimer, the term of this patent is extended or adjusted under 35 U.S.C. 154(b) by 39 days.

(21) Appl. No.: 09/957,245

(22) Filed: Sep. 21, 2001

(51) Int. Cl.[7] .................................................. H01H 9/00
(52) U.S. Cl. ..................................... 335/205; 340/398.2
(58) Field of Search .................... 340/392.1, 398.2; 335/206, 207

(56) References Cited

U.S. PATENT DOCUMENTS 3,734,054 A * 5/1973 Anderson ................... 116/148
5,914,650 A * 6/1999 Segan ......................... 340/328
5,977,873 A * 11/1999 Woods ......................... 340/547

* cited by examiner

Primary Examiner—Elvin Enad
Assistant Examiner—Bernard Rojas
(74) Attorney, Agent, or Firm—Rosenberg, Klein & Lee

(57) ABSTRACT

A doorbell mechanism includes a triggering board and a main body of a conventional doorbell. The triggering board has a magnet-sensible device and a decorative doorknocker. The magnet-sensible device and the decorative doorknocker are respectively provided with a magnet, and the doorbell can be switched on or off by means of the interaction of the magnetic fields of the magnet-sensible device and the decorative doorknocker. The decorative doorknocker can be provided with an elongate pulling piece convenient for a short person or a kid to use.

2 Claims, 7 Drawing Sheets

MAGNET-SENSIBLE TRIGGERING DOORBELL MECHANISM

BACKGROUND OF THE INVENTION

1. Field of the Invention

The present invention relates to a magnet-sensible triggering doorbell mechanism, and more particularly to a doorbell mechanism which is provided with a magnet-sensible device so as to function more efficiently and can be provided with a pulling piece extended from the triggering doorknocker convenient for a short person or a kid to use.

2. Description of the Related Art

In the societies of multi-storied buildings, apartment houses are more and more. A doorbell is necessary to be provided on the outside wall surface of every house in order for a visitor to notify persons in the house, and in the door plank of every apartment house is provided with a door viewer convenient for a person in the house to see who is the visitor outside before opening the door for the sake of safety.

Nowadays, the prices of conventional doorbells are not competitive in the present markets of low prices. The creativity of the conventional push-button doorbells is limited to the modification of shapes, and there is no more brand-new improvement besides wireless type of doorbells. Furthermore, the push-button device of the conventional doorbells is easy to be ill contracting when being operated.

SUMMARY OF THE INVENTION

Accordingly, the present invention is directed to a magnet-sensible triggering doorbell mechanism that can substantially obviate the drawbacks and promote the practical use of conventional related doorbells.

An object of the present invention is to provide a doorbell mechanism that is provided with a magnet-sensible device so as to function more efficiently and to avoid from ill contacting.

Another object of the present invention is to provide a doorbell mechanism that is provided with a traditional style of decorative doorknocker not only to catch the reactive trend but also to let the doorbell mechanism look artistic.

Yet another object of the present invention is to provide a doorbell mechanism that can be provided with a pulling piece extended from the triggering doorknocker convenient for a short person or a kid to use without trouble.

To achieve these advantages, a doorbell mechanism in the present invention includes a triggering board and a main body of a conventional doorbell. The triggering board has a magnet-sensible device and a decorative doorknocker. The magnet-sensible device and the decorative doorknocker are respectively provided with a magnet, and the doorbell can be switched on or off by means of the interaction of the magnetic fields of the magnet-sensible device and the decorative doorknocker. The decorative doorknocker can be provided with an elongate pulling piece convenient for a short person or a kid to use.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
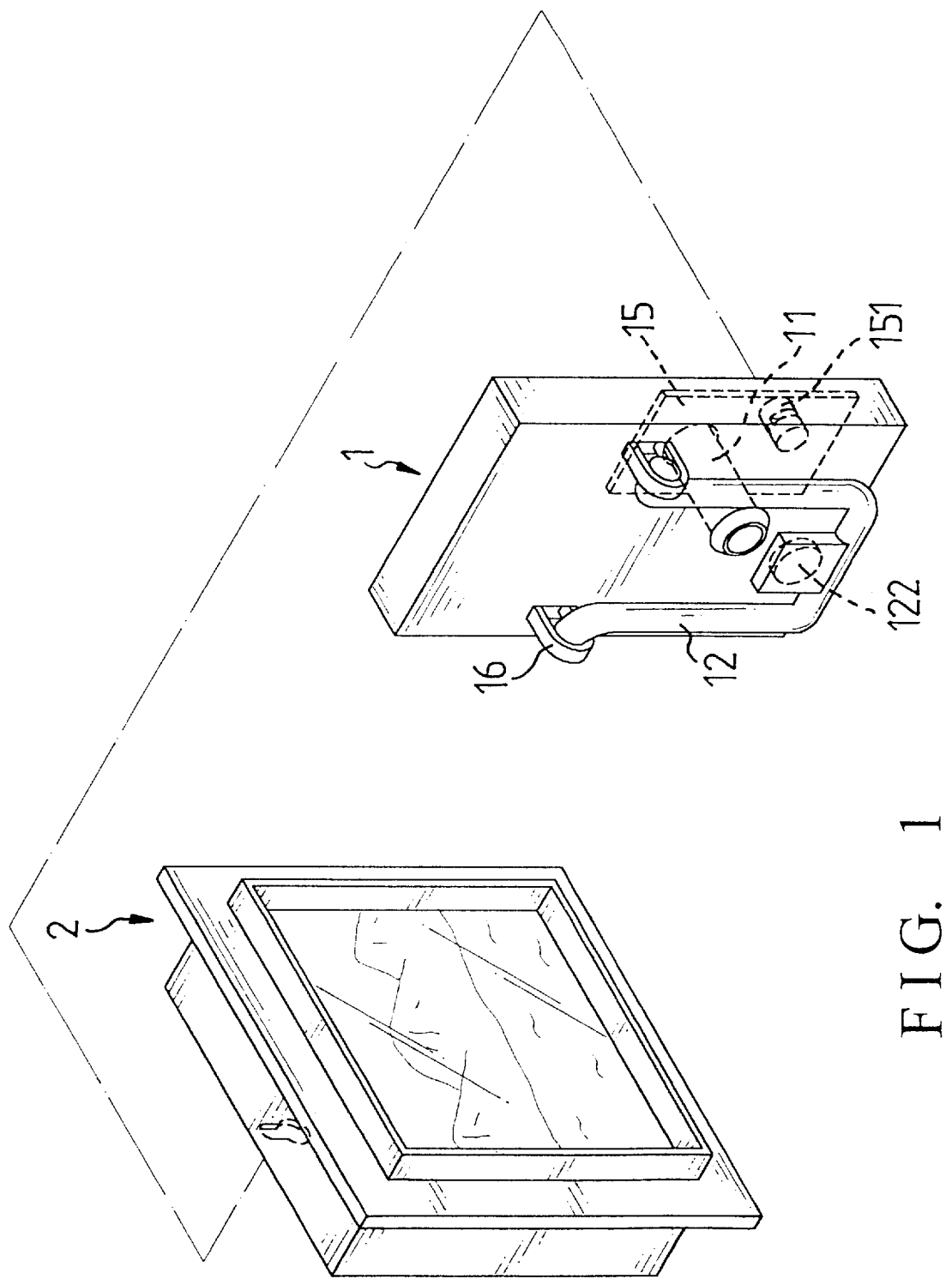
FIG. 1 is a perspective exploded view of an embodiment of the doorbell mechanism in accordance with the present invention.
Figure 2:
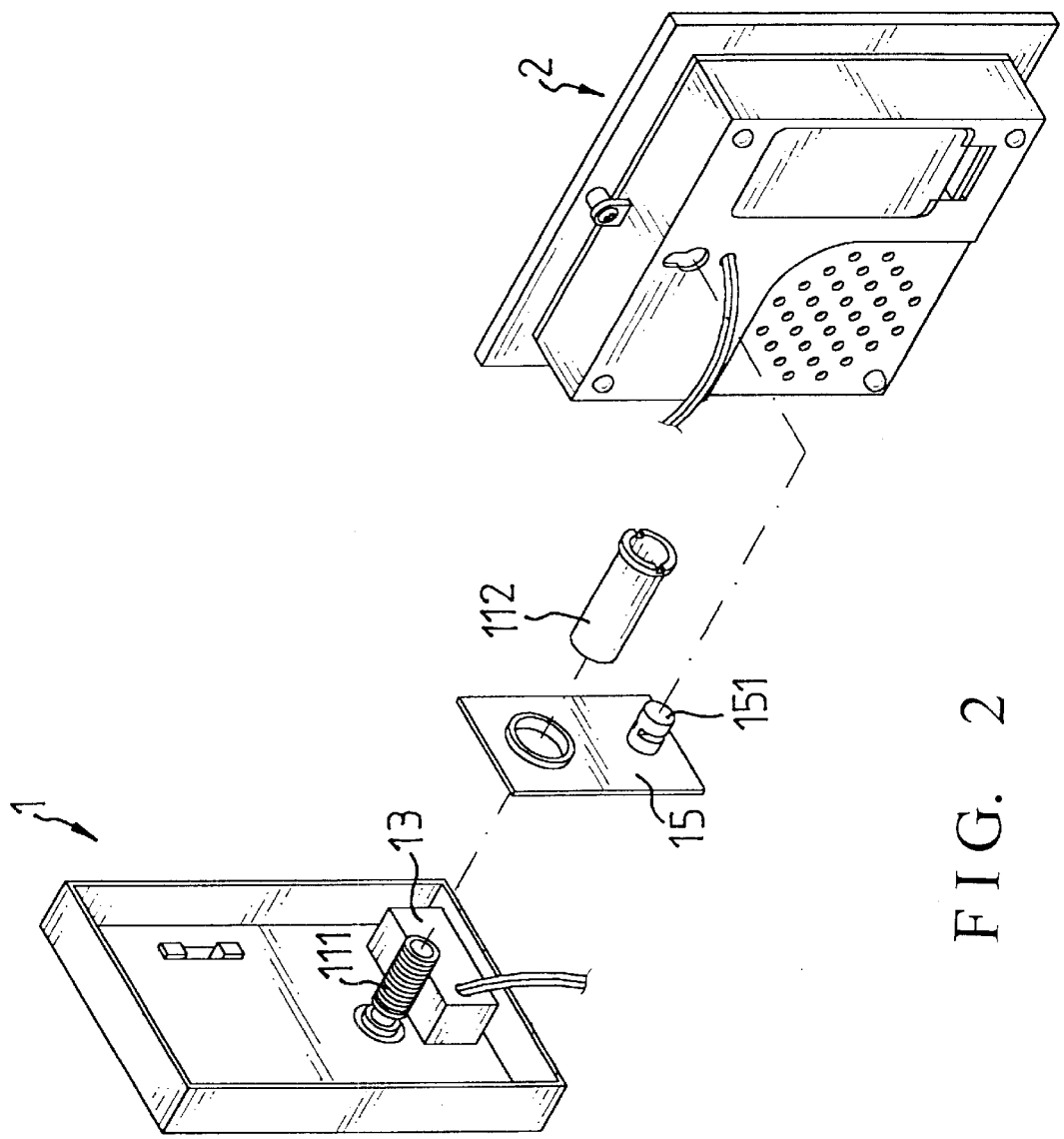
FIG. 2 is a perspective exploded view of an embodiment of the triggering board in accordance with the present invention.
Figure 3:
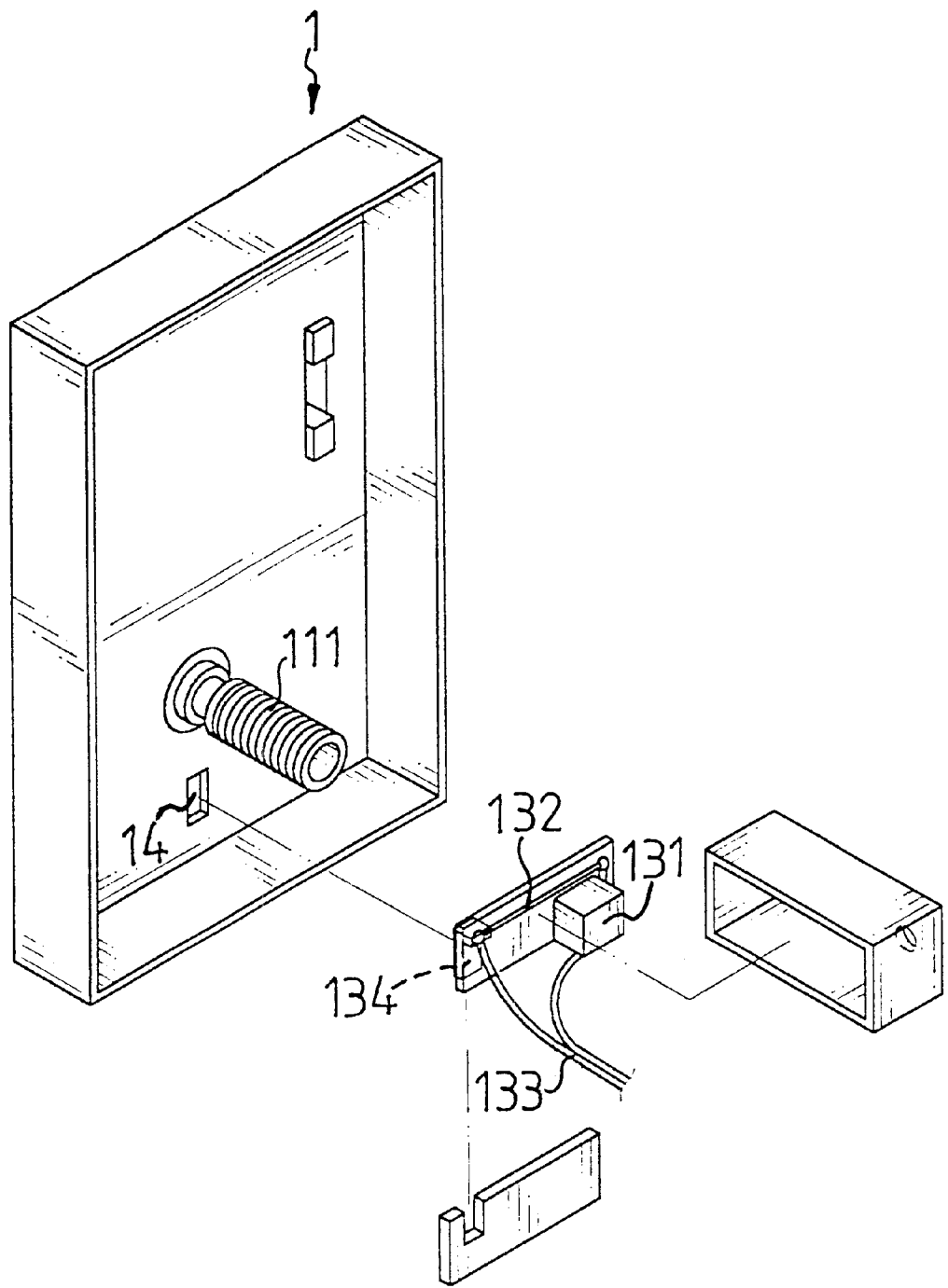
FIG. 3 is a perspective exploded view of an embodiment of the magnet-sensible device in accordance with the present invention.

Referring to FIGS. 1, 2 and 3, a preferred embodiment of a magnet-sensible triggering doorbell mechanism in the present invention includes a triggering board 1 and a main body 2 of a conventional doorbell. The triggering board 1 is composed by a door viewer sleeve 11, a decorative doorknocker 12 and a magnet-sensible device 13.

Referring to FIG. 2, the door viewer sleeve 11 includes a left screwing section 111 and a right screwing sleeve 112. The left screwing section 111 is provided to penetrate through the hole in the triggering board 1, the door viewer of a door plank 3 and the hole of a connecting strip 15 and then is screwed by the right screwing sleeve 112. The connecting strip 15 is provided with a protruding post 15 1 for the main body 2 of a doorbell to be mounted on the inner surface of the door plank 3.

Figure 7:
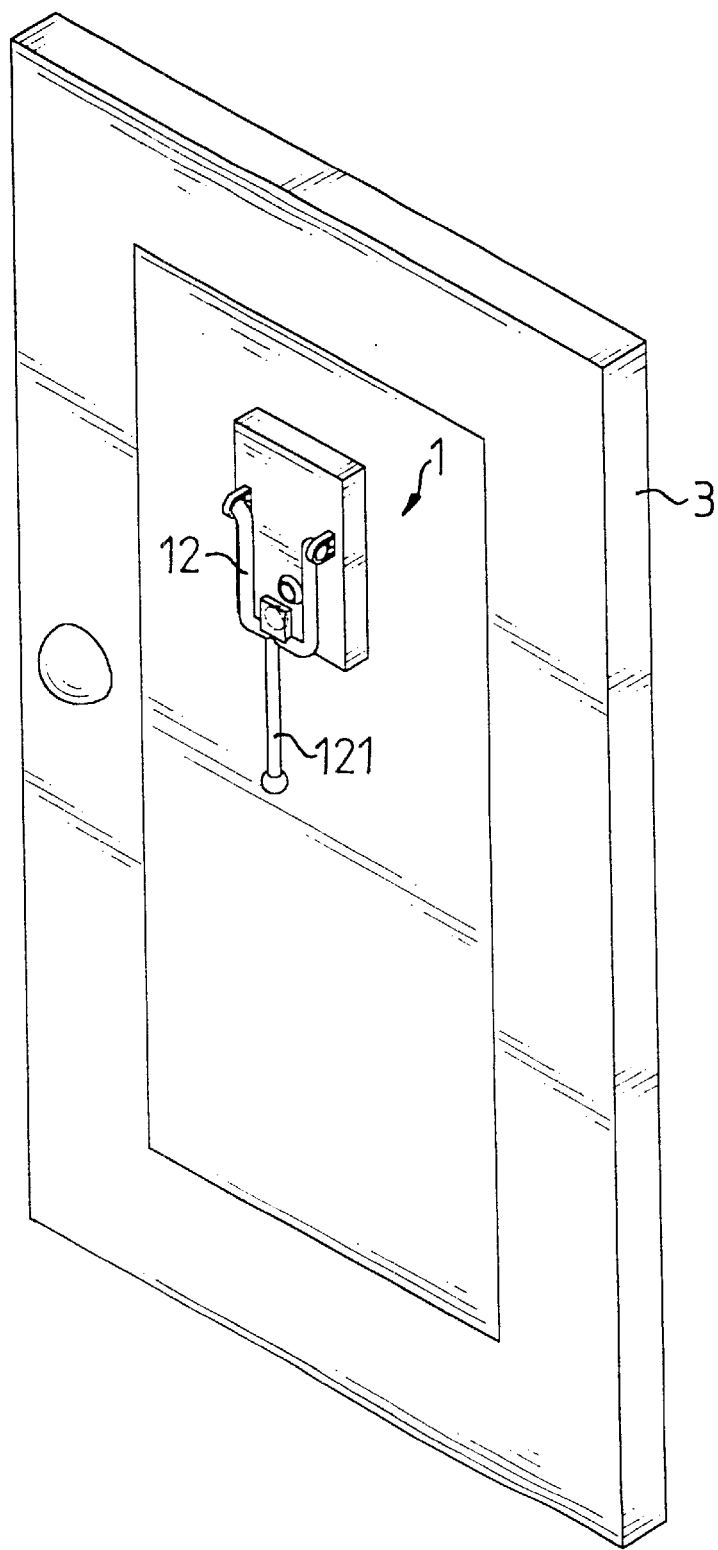

Referring to FIG. 1, the decorative doorknocker 12 can be various designs and can be provided with an elongate pulling piece 121, as shown in FIG. 7. Both ends of the decorative doorknocker 12 are respectively pivotally received in both pivotal ears 16 on the outer surface of the triggering board 1. A magnet 122 is provided on a predetermined position of the decorative doorknocker 12.

Referring to FIG. 3, the magnet-sensible device 13 is provided in the lower interior of the triggering board 1 and includes a magnet 131, a magnetic spring tube 132, a wiring 133 and a metal strip 134. Both ends of the magnetic spring tube 132 connect with the wiring 133, and the wiring 133 connects with the rear distal end of the wiring of the main body 2 so as to form a circuit.

Figure 4:
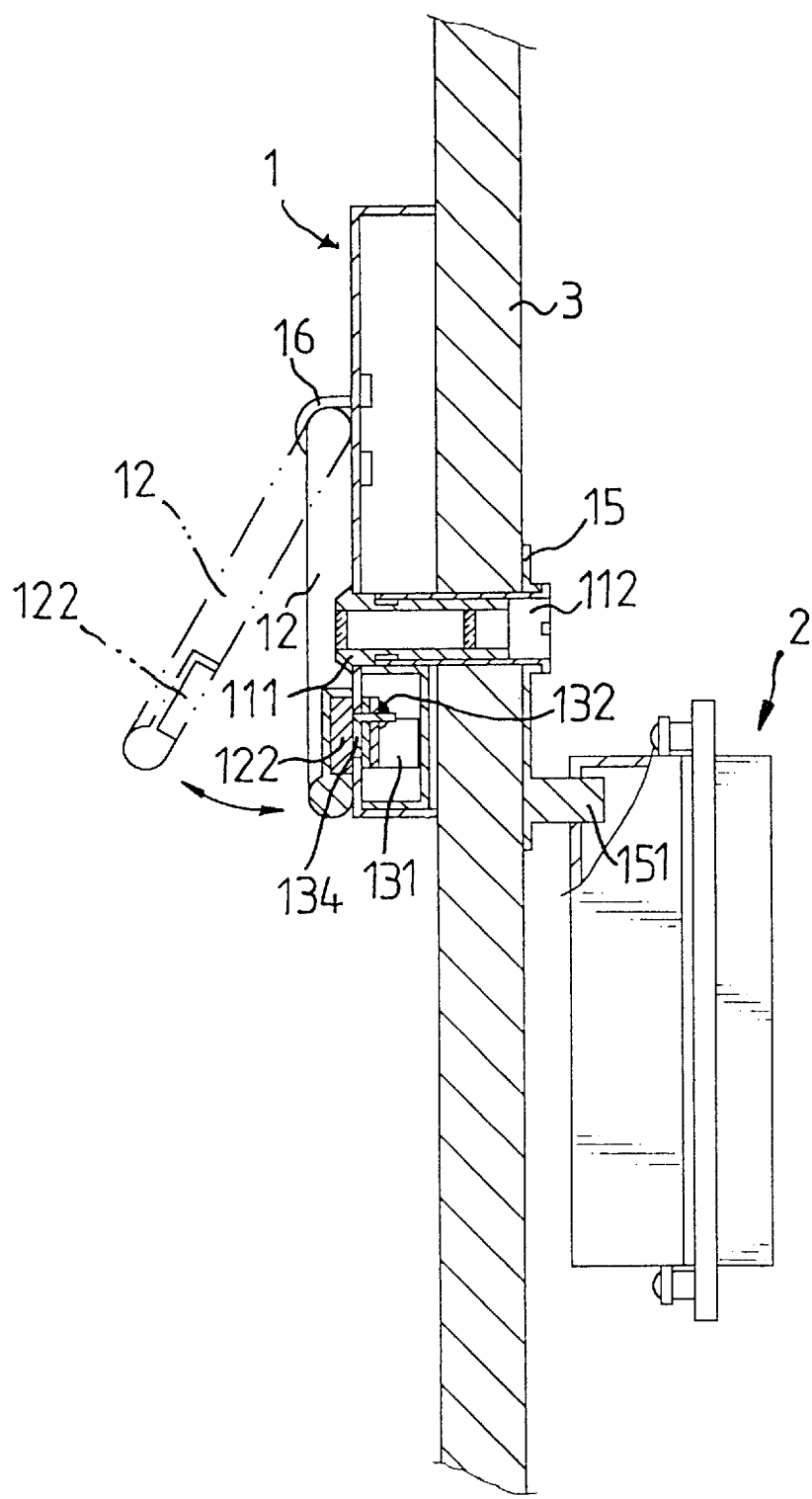
FIG. 4 is a schematic sectional view of the doorbell mechanism in assembled configuration and showing the doorknocker being operated in accordance with the present invention.
Figure 6:
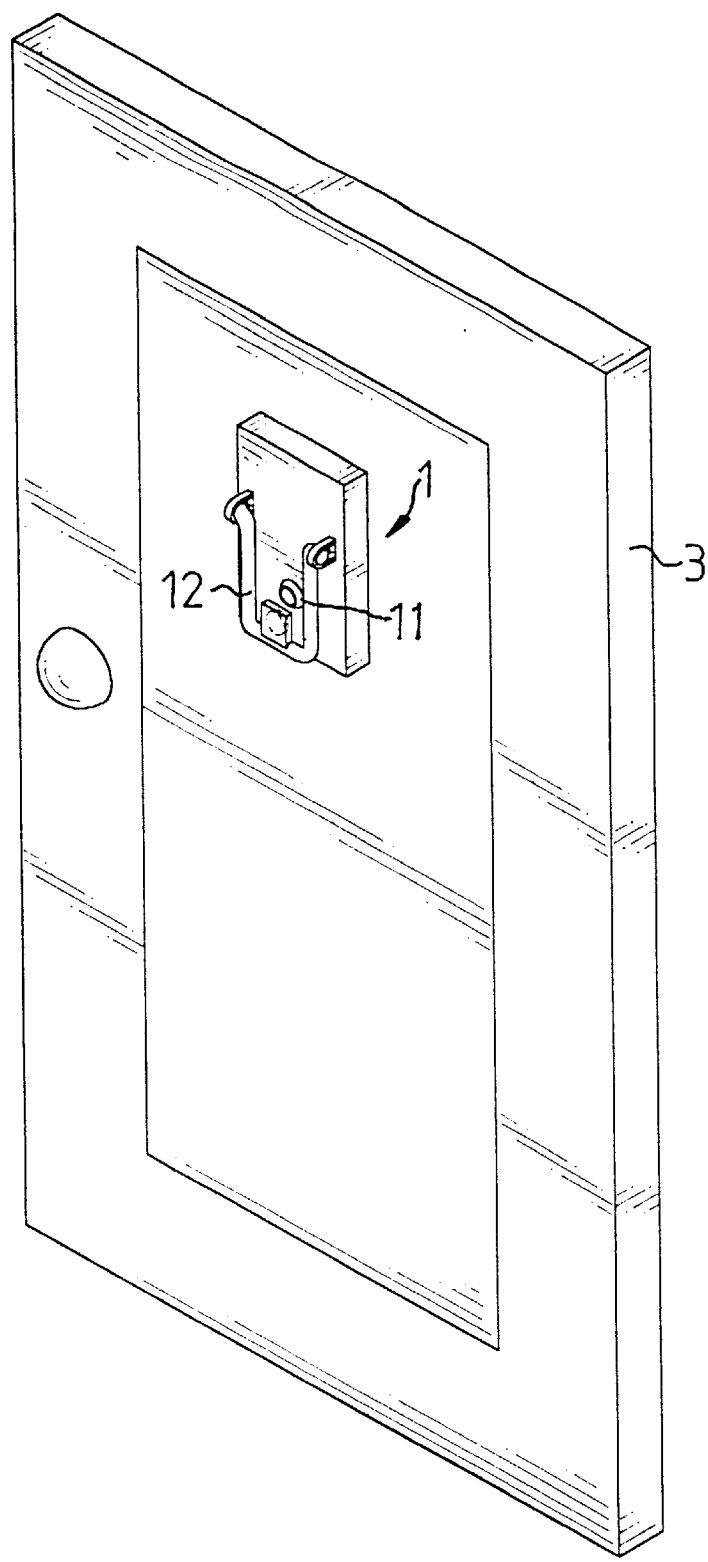
FIG. 6 is a perspective view of the doorbell mechanism in accordance with the present invention being mounted on the door plank; and, FIG. 7 is another perspective view of the doorbell mechanism in accordance with the present invention being mounted on the door plank.

While being assembled, referring to FIGS. 4 and 6, the left screwing section 111 penetrates through the hole in the triggering board 1, the door viewer of a door plank 3 and the hole of the connecting strip 15 and then is screwed by the right screwing sleeve 112 so as for the triggering board 1 to be firmly secured to the outer surface of the door plank 3. The main body 2 of a doorbell is secured to the inner surface of the door plank 3 by mounting on the protruding post 151 of the connecting strip 15. The wiring 133 of the the magnet-sensible device 13 connects with the rear distal end of the wiring of the main body 2, and the metal strip 134 is inlaid in the hole 14 of the triggering board 1.

Figure 5:
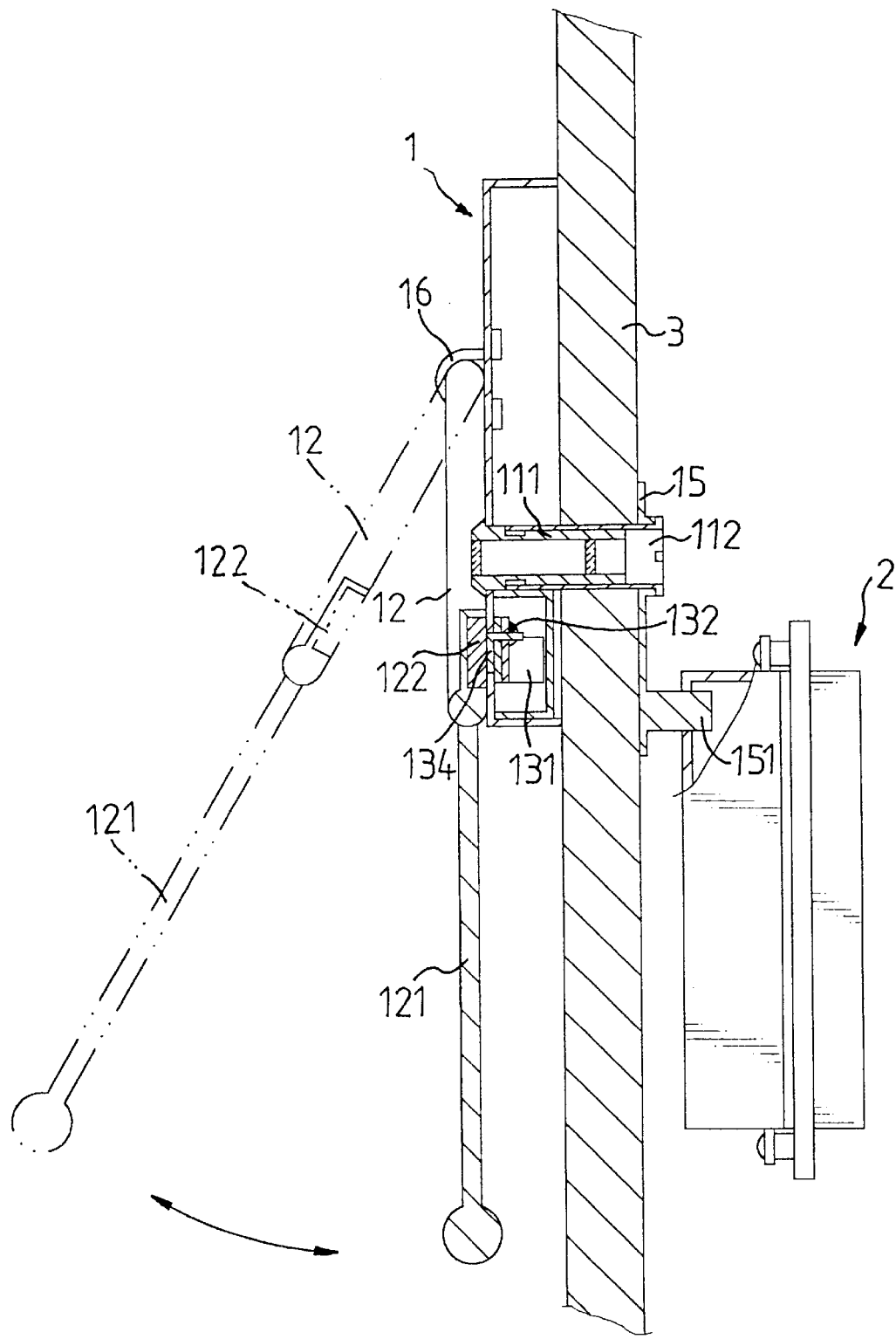
FIG. 5 is a schematic sectional view of the doorbell mechanism in assembled configuration and showing the elongate pulling piece from the doorknocker being operated in accordance with the present invention.

While being operated, referring to FIGS. 4 and 5, the decorative doorknocker 12 or the pulling piece 121 is pulled to separate the magnet 122 of the decorative doorknocker 12 from the metal strip 134 of the magnet-sensible device 13, and the magnetic spring tube 132 of the magnet-sensible device 13 will be triggered by the magnetic field to switch on the wiring 133 and the rear distal end of the main body 2 of the doorbell to form a circuit so as to ring the doorbell. On the contrary, when the magnet 122 of the decorative doorknocker 12 and the metal strip 134 attract each other, the magnetic spring tube 132 of the magnet-sensible device 13 will be influenced by the interaction of two magnetic fields and switch off the wiring 133 and rear distal end of the main body 2 of the doorbell so as to stop ringing the doorbell.

While the preferred embodiments of the invention have been described above, it will be recognized and understood that various modifications may be made thereto and the appended claims are intended to cover all such modifications which may fall within the spirit and scope of the invention.

What is claimed is:

1. A magnet-sensible triggering doorbell mechanism comprising:

a triggering board being provided to secure to the outer surface of a door plank by a door viewer sleeve, said door viewer sleeve being provided with a left screwing section and a right screwing sleeve, said left screwing section penetrating through the hole in said triggering board, a door viewer of said door plank and the hole of a connecting strip and being screwed by said right screwing sleeve, said connecting strip being provided with a protruding post for a doorbell to be mounted on the inner surface of said door plank;

a decorative doorknocker being provided on the outer surface of said triggering board, both ends of said decorative doorknocker being respectively pivotally received in both pivotal ears of said triggering board, a magnet being provided on a predetermined position of said decorative doorknocker; and, a magnet-sensible device being provided in the lower interior of said triggering board and including a magnet, a magnetic spring tube, a wiring and a metal strip, both ends of said magnetic spring tube connecting with said wiring, said wiring connecting with the rear distal end of the wiring of the main body of said doorbell so as to form a circuit.

2. The magnet-sensible triggering doorbell mechanism as recited in claim 1 wherein said decorative doorknocker can be various designs and can be provided with an elongate pulling piece.

* * * * *